US005902670A

United States Patent [19]

Ripstein

[11] Patent Number: 5,902,670

[45] Date of Patent: May 11, 1999

[54] MULTI-LAYERED PAINTING AND METHOD THEREFOR

[76] Inventor: Jacqueline Ripstein, 2800 Williams Island Blvd., No. 804, Miami, Fla. 33160

[21] Appl. No.: 08/868,821

[22] Filed: Jun. 4, 1997

[51] Int. Cl.[6] .......... B32B 5/16; B32B 7/00

[52] U.S. Cl. .......... 428/206; 428/199; 428/207

[58] Field of Search .......... 428/199, 206, 428/207; 156/90

[56] References Cited

U.S. PATENT DOCUMENTS

| | | | |
|---|---|---|---|
| 2,430,232 | 8/1947 | Lynch | 40/543 |
| 2,654,971 | 8/1953 | Harrison | 40/542 |
| 3,068,010 | 3/1962 | Hagopian | 273/295 |
| 3,105,954 | 10/1963 | Gill, Jr. | 340/928 |
| 4,122,237 | 10/1978 | Kaiserman | 428/195 |
| 4,652,464 | 3/1987 | Ludlum | 427/157 |
| 4,745,286 | 5/1988 | Jones | 250/459.1 |
| 5,018,232 | 5/1991 | Sachetti | 5/482 |
| 5,084,309 | 1/1992 | Smith et al. | 428/29 |
| 5,172,937 | 12/1992 | Sachetti | 283/81 |

*Primary Examiner*—D. S. Nakarani
*Assistant Examiner*—Ramsey Zacharia
*Attorney, Agent, or Firm*—Welsh & Katz, Ltd.

[57] ABSTRACT

A multi-layered painting includes a first paint layer applied to a backing material as a viscous liquid. The first paint layer is either an oil-based, non-latex paint or a latex, non-oil-based paint. A sealing medium is applied over the first paint layer to form a barrier to bleed-through from and to subsequent paint layers. A second paint layer is applied over the sealing medium as a viscous liquid. The second paint layer is the other of the oil-based, non-latex paint and the latex, non-oil-based paint. One or both of the first and second paint layers includes a transparent luminescent pigment that is not luminescent under only ambient and incandescent light. The paint having the pigment produces a luminescent effect when subject to ultraviolet light, wherein the painting exhibits one visible object when subjected to ambient, incandescent and fluorescent light and at least one different visible object when subjected to ultraviolet light. A method for creating the painting is also disclosed.

9 Claims, No Drawings

MULTI-LAYERED PAINTING AND METHOD THEREFOR

FIELD OF THE INVENTION

This invention relates to a multi-layered oil-based and latex painting. More particularly, the invention relates to a painting created in multiple layers, having at least one layer of a latex paint and one layer of an oil-based paint with a sealing medium disposed between the paint layers.

BACKGROUND OF THE INVENTION

Paintings have evolved from the early cave man paintings found in various parts of the world to become some of the most revered and defined works of art today. Paintings are far and away the most widely exhibited form of art work in museums and galleries throughout the world.

Paint is essentially a viscous fluid that consists of a vehicle or binder, and a pigment. Optionally, the paint can include a solvent or thinner, a dryer, a biostat or biocide and an ultraviolet blocker or stabilizer. Paint can be applied as a fluid in thin coats or layers that dry to a solid. The drying phenomena is generally not reversible. That is, the dried paint cannot be transformed back into the viscous fluid state. The change to a solid, i.e., the drying phenomena, may occur by evaporation of the solvent, by chemical reaction or by a combination of both evaporation and chemical reaction.

There are two principal types of paint. One type of paint, commonly known as oil-based paint, uses an oil or oil-based vehicle to carry the pigment or coloring agent. Oil-based paints typically contain a dryer to accelerate the drying process. Such paints typically dry by oxidation and solidify by cross linking, which is a chemical reaction.

Another type of paint is a water-based, latex paint. Such paints use water as the fluid or liquid vehicle. Early water-based paints were water sensitive and thus had limited uses. Recent developments in water-based paints have resulted in paints having greater water resistance. The paint is applied as a fluid and the water evaporates (with possible further chemical change, i.e., oxidation or polymerization), leaving a film coating.

One modern form of painting uses the simulated movement of characters, environment, background and the like to produce visually pleasing effects. Such effects attempt to create the impression or appearance that objects within the painting appear suddenly before a viewer's eyes or move as the viewer's perception or lighting conditions change. One method of achieving the desired simulated motion is by using different types of media such as different types of paint. Mixing such media can be done with the use of ordinary paint in combination with light emitting luminescent or phosphorescent paint, in, for example, a layered application.

Those skilled in the art will recognize that oil-based and water-based latex paints have outstanding characteristics in that they provide a durable media, and offer a wide variety of colors, tones and textures. It has, however, been observed that layering water-based latex paint with oil-based paint, either of which have ultraviolet activated pigments, can result in cracking of the over-coat.

Further, when layering water-based latex paint with oil-based paint, it has been observed that the layers can bleed into each other or the visual images can blur. The consequences of such bleeding and blurring are that the sharpness of the image may be lost and thus the aesthetic value of the painting diminished. This is particularly true for paintings which include such luminescent pigments.

Accordingly, there continues to be a need for a painting and a method therefor which permits the use of layers of oil-based paints and water-based paints one on top of the other, which paints may include a transparent luminescent paint pigment. Such a painting will resist cracking and will provide sharp, visually and aesthetically pleasing images without blurring, fading or bleeding of the painted images.

SUMMARY OF THE INVENTION

A multi-layered painting created on a backing such as canvas includes a first paint layer applied to the backing material as a viscous liquid. The first paint layer is either an oil-based, non-latex paint or a latex, non-oil-based paint. A sealing medium is disposed on the first paint layer to form a barrier to bleed-through from and to subsequent paint layers. A second paint layer is disposed on the sealing medium as a viscous liquid, the second paint layer being the other of the oil-based, non-latex paint and the latex, non-oil-based paint.

In a preferred embodiment, the sealing medium is varnish.

Preferably, one of the first and second paint layers includes a transparent pigment that produces a luminescent effect when subject to ultraviolet light, and does not include a pigment that is luminescent under only ambient and incandescent light. The luminescent pigment produces an effect wherein the painting exhibits one visible object when subjected to ambient and incandescent light and a different visible object when subjected to ultraviolet light. That is, the paint includes a pigment that can be invisible under normal, e.g., incandescent, fluorescent and ambient light conditions, which pigment becomes visible when subject to ultraviolet light.

It is contemplated that both the first and second layers can include the ultraviolet luminescent pigment. The painting can be created using a plurality of the paint layers with adjacent paint layers having the sealing medium disposed therebetween. Alternately, the painting can include a plurality of first or second paint layers directly on one another, without intervening sealing medium layers.

A method of creating the multi-layered painting includes providing a backing material, such as canvas, and applying a first paint layer to the backing material. The canvas may first be treated before the application of the first paint layer. The first paint layer is applied to the backing material as a viscous liquid, and consists of either the oil-based, non-latex paint or the latex, non-oil-based paint. The first paint layer is then dried, and a sealing medium is applied to the first paint layer and dried to form a barrier to bleed-through from and to subsequent paint layers.

A second paint layer is applied over the dried sealing medium. The second paint layer is applied as a viscous liquid and is the other of the oil-based, non-latex paint and said latex, non-oil-based paint. The second paint layer is then dried.

Additional paint layers can be applied one on the other, with the sealing medium applied between layers, if the layers are of different paint types. Where the layers are of the same paint type (e.g., adjacent layers are latex paint or oil-based paint) the sealing medium is not required between adjacent layers.

Either or both of the paint layers can include a transparent luminescent pigment. The paint that includes luminescent pigment produces a luminescent effect when subject to ultraviolet light. The painting will thus exhibit one visible object when subjected to ambient and incandescent light and at least one different visible object when subjected to ultraviolet light.

Other features and advantages of the present invention will be apparent from the following detailed description and the appended claims.

DETAILED DESCRIPTION OF THE PREFERRED EMBODIMENTS

While the present invention is susceptible of embodiment in various forms, there will hereinafter be described presently preferred embodiments and methods with the understanding that the present disclosure is to be considered an exemplification of the invention and is not intended to limit the invention to the specific embodiments and methods described.

Artists make use of luminescent pigments in paint to produce a variety of visual effects. Mixed media is also used to create or enhance the aesthetic appeal of art work. In one application, artists will use a combination of oil-based and water-based paints to create certain varied effects. The combination of oil and water-based paints can be used with luminescent pigments as well.

As is common in artists' works, paint, inks and the like are often applied to a backing material such as canvas, in layers. When the materials, and particularly a combination including luminescent pigments, are applied to a canvas, it has been observed that the layers will tend to bleed into one another and detract from the overall aesthetic appeal of the artistic work. Such problems have been particularly observed when using water-based latex artist's media.

Nevertheless, artists continue to apply layers of water-based latex paint and oil-based paint over one another on a canvas or like backing material to achieve their desired objectives. However, it has been observed that these paints will tend to bleed into one another or blur, which detracts from the aesthetic appeal of the art work and may ultimately reduce the value of the art work.

Unexpectedly, it has been found that seriatim layers of oil-based paints and latex paints with intervening layers of a sealing medium, such as varnish, can be applied to create painted art work having a variety of desired optical effects. The sealing medium hardens and coats the paint layer to form a barrier to bleed-through from and to subsequent paint layers. Essentially, the hardened sealing medium forms a coating that is substantially liquid-impervious. As a result of the seriatim application of paint layers, with intermediate sealing layers, the oil-based and latex paints are separated from one another, do not bleed into the other layers, and do not blur the other layer or layers.

It has been found that using such a painting technique, differing visual characteristics can be created within a painting when observed under different light conditions. For example, in a painting, while one particular scene or object is observed under normal, e.g., ambient, incandescent and fluorescent light conditions, other scenes, objects or parts of the painting are observed only when the painting is subjected to ultraviolet light, commonly referred to as "black light."

Because of the differing characteristics of oil-based and latex paints, it may be desirable to use a combination of these paints in a single painting. However, as discussed above, because of the tendency of the paint layers to bleed into one another or to blur when used together, it has not been possible to create such combinations with any great success. This is particularly so when the paints include luminescent pigments.

It has been found that applying intervening sealing layers of, for example, varnish or lacquer, sufficiently separates the oil-based and latex paint layers from one another, and provides a barrier therebetween, to prevent the problems of bleeding to and from subsequent paint layers, and blurring noted above. Unexpectedly, application of the varnish does not detract from the fluorescent character of the luminescent pigments. Rather, it has been observed that such pigments retain their ability to luminesce when subject to ultraviolet light conditions regardless of whether they are applied on, or covered by, the sealing medium.

Those skilled in the art will recognize that it is important that the sealing medium not contain an ultraviolet (UV) blocker that blocks or prevents the transmission of ultraviolet light having the specific activating frequencies or wavelengths that stimulate the color of the luminescent pigments. UV blockers can be used that block or prevent the transmission of ultraviolet energy having frequencies or wavelengths other than the activating frequencies or wavelengths, to protect the underlying materials.

The present layering configuration can thus be used to create enhanced artistic works that include luminescent pigments in one or both of the oil-based and latex paints. The true painted images are maintained in all of the paint layers using the present method, regardless of whether the oil-based or latex paint is first applied to the canvas.

In one embodiment, a first layer of oil-based paint is applied to a canvas. The oil-based paint can be formulated with a luminescent pigment. After the paint has been given a sufficient period of time to dry, a layer of a clear sealant, such as varnish, is applied to the oil-based paint. The varnish is then permitted to dry, and a layer of latex paint is applied to the painting over the varnish. Again, the latex paint can include a luminescent pigment.

Additional layers of paint can be applied to one another using this technique, having varnish layers intermediate each of the layers of oil-based and latex paints. This direct layering technique creates a homogenous structure on the canvas. Moreover, this combination of oil-based and latex paints having an intermediate sealing layer provides the artist with greater flexibility in combining such mixed media. Thus, the visual and aesthetic appeal of the painting can be further enhanced and the artistic objective of the artist can be achieved.

The oil-based paint can use a natural or a synthetic oil. Examples of suitable natural oils include linseed oil, soy oil, rapeseed oil, castor oil and combinations thereof. The natural oils may include various non-plant oils, such as fish oils. The natural oils can be used directly, e.g., unmodified, or after chemical modification to enhance their performance.

Examples of suitable synthetic oils include those derived from di, tri and tetraols reacted with aromatic carboxylic acids having from six to 14 C atoms (other than the C atoms in the carboxylic acid groups), of aliphatic dicarboxylic acids having from four to eight C atoms in the chain, or of cycloaliphatic dicarboxylic acids having from six to 14 C atoms (other than the C atoms in the carboxylic acids groups). Examples of such dicarboxylic acids to be included with terephthalic acid are phthalic acid, isophthalic acid, naphthalene-2,6-dicarboxylic acid, diphenyl-4,4'-dicarboxylic acid, adipic acid, sobacic acid, and cyclohexane diacetic acid, napthalene-1,2-dicarboxylic acid (and anhydride), naphthalene-2,3-dicarboxylic acid (and anhydride), succinic acid, maleic acid, maleic anhydride, fumaric acid, glutatic acid and citric acid.

Other suitable acids include naphthalene-1,X-dicarboxylic acid, wherein X=3 to 8; naphthalene-2,X-dicarboxylic acid, wherein X=4 to 8; diphenyl-2, X-dicarboxylic acid where X=2',3' or 4'; diphenyl-3,X-dicarboxylic acid where X=3' or 4'; and aliphatic and cycloaliphatic di and tri-carboxylic acids.

The paints may be further modified by the addition of viscosity modifying materials such as bentonite, fumed silica and the like; di and triols such as ethylene glycol, 2-2'oxydiethanol, glycerol and the like; and solvents and diluents such as common mineral spirits, naphtha, turpentine, paint thinner, white oil, benzene, toluene, o-xylene, m-xylene, p-xylene, mixtures of xylenes, methoxyethanol, ethoxyethanol, propoxyethanol, i-propoxyethanol, butyoxyethanol, 1-methoxypropanol, 2,2-dimethoxypropanol, and the like.

In a current embodiment, the oil-based and/or the latex paint can be formulated with a luminescent pigment, including an 8-hydroxyquinoline aluminum complex, other organic based luminescent materials, and optical brighteners. Preferably, the luminescent pigments are formed from rare earth oxides, such as lanthanide oxides. The lanthanide oxides, exemplary of which are $PrO_2$, $Nd_2O_{hd\ 3}$, $Sm_2O_{hd\ 3}$, $Eu_2O_{hd\ 3}$, $Ho_2O_{hd\ 3}$, $Er_2O_{hd\ 3}$, $Tm_2O_3$, will which exhibit various luminescent properties when subjected to ultraviolet light. Such rare earth oxides are available from United Mineral & Chemical Corporation of Lyndhurst, N.J. and Nemoto & Co. Ltd., of Tokyo, Japan. Those skilled in the art will recognize that a wide variety of pigments of differing types can be used in the present invention.

The latex paint is generally formed by emulsion polymerization. The most common latexes are made from a copolymer of butadiene and styrene, from vinyl acetate, and from various acrylic monomers. Although the specific properties and performances of these paints may differ slightly dependent upon the polymer or polymers from which they are made, they are all carried in a water or water-rich, water-soluble vehicle. The latex paint may include luminescent pigments as described above.

The sealer that is used intermediate the layers of latex and oil-based paint is a surface coating that is applied as a liquid and subsequently hardens to a solid. In one known technique, the sealer is varnish. Varnish is a solution of resinous material in a solvent that dries by evaporation of the solvent or by a chemical reaction. It is anticipated that any one of a number of different types of varnishes can be used for the present invention. Spirit varnishes, which generally have an alcohol solvent, dry by evaporation of the solvent. One common type of spirit varnish is shellac which is made by dissolving shellac in alcohol solvent. Oleoresinous varnishes may also be used as a sealer. Drying or hardening of the oleoresinous varnish occurs through a combination of polymerization of the drying oil as well as evaporation of the solvent. Alternative sealants include lacquers, transparent polyurethanes, alkyds and the like.

In use, a base or backing material, such as canvas, is prepared to receive the paint or other artist's media. It will be recognized by those skilled in the art that the backing media may include a wide variety of materials other than canvas, including porous materials such as cardboard, paper, wood and ceramics, as well as non-porous materials such as plastics, glazed ceramics and the like. For purposes of the present application, reference to canvas or artist's canvas is intended to include all such backing media. The backing material, which can be an artist's canvas, may be prepared prior to use. Such preparations may include sealing the canvas, or preparing the canvas for receiving the paint. Such preparations will be understood by those skilled in the art.

The paints are then prepared for application to the canvas. The paint can include one or more transparent luminescent pigment. Either the oil-based paint or the latex paint is then first applied to the canvas. After the paint has had a sufficient period of time in which to dry, a layer or a coating of the sealer is applied to the first layer of paint. A subsequent layer of the other of the oil-based paint or latex paint can then be applied over the sealer.

Advantageously, the paint layers can be applied in any order beginning with the latex or oil-based paint. Like paints can be applied in layers one over the other without an intermediate sealer. That is, a layer of oil-based paint can be applied over another layer of oil-based paint without the intervening sealer. It will be recognized by those skilled in the art that because either the latex paint or the oil-based paint, or both, can be enhanced with luminescent pigments, the ability to create a wide variety of visual effects is enhanced.

Paintings created in accordance with the present invention and using the method herein provide an artist with the ability to create art work using mixed media having extreme visual and aesthetic appeal. The layering of different types of paints with intervening sealer layers can be repeated, continuously, to effect visual images heretofore unknown. Moreover, because the sealer between the layers of paint provides a hard, non-absorbing surface or barrier on which to apply the subsequent paint layer, the opportunity for images and differing layers to blur or bleed into one another is minimized if not eliminated.

From the foregoing, it will be observed that numerous modifications and variations can be effectuated without departing from the true spirit and scope of the novel concepts of the present invention. It is to be understood that no limitation with respect to the specific embodiment illustrated is intended or should be inferred. The disclosure is intended to cover by the appended claims all such modifications as fall within the scope of the claims.

What is claimed is:

1. A multi-layered painting consisting essentially of:

a first paint layer applied to a canvas as a viscous liquid, said first paint layer consisting essentially of an oil-based non-latex paint or a latex non-oil-based paint;

a sealing medium disposed on said first paint layer to form a barrier to prevent bleed-through from and to subsequent paint layers; and a second paint layer disposed on said sealing medium as a viscous liquid, said second paint payer consisting essentially of the other of said oil-based non-latex paint or latex non-oil-based paints, wherein the first or second paint layer includes a transparent luminescent pigment that is not luminescent under ambient and incandescent light, formulated with said paint, for producing a luminescent effect when subjected to an ultraviolet light, wherein the painting exhibits one visible object when subjected to ambient and incandescent light and wherein the painting exhibits at least one different visible object when subjected to an ultraviolet light.

2. The multi-layered painting in accordance with claim 1 wherein said first paint layer is an oil-based, non-latex paint.

3. The multi-layered painting in accordance with claim 1 wherein said first paint layer is a non-oil-based latex paint.

4. The multi-layered painting in accordance with claim 1 wherein said sealing medium is varnish.

5. The multi-layered painting in accordance with claim 1 wherein said sealing medium is lacquer.

6. The multi-layered painting in accordance with claim 1 including a plurality of said paint layers, each said layer having a sealing medium disposed between adjacent paint layers.

7. The multi-layered painting in accordance with claim 1 including a plurality of first paint layers directly on one another.

8. The multi-layered painting in accordance with claim 1 including a plurality of second paint layers directly on one another.

9. The multi-layered painting in accordance with claim 1, wherein the first paint layer includes the transparent luminescent pigment, and wherein the sealing layer is devoid of ultraviolet blockers.

* * * * *